March 10, 1925.

E. E. JONES

AUTOMOBILE BUMPER

Filed July 2, 1923

1,528,926

INVENTOR
EDWARD E. JONES

BY Harry Schroeder
ATTORNEY

Patented Mar. 10, 1925.

1,528,926

UNITED STATES PATENT OFFICE.

EDWARD E. JONES, OF BERKELEY, CALIFORNIA.

AUTOMOBILE BUMPER.

Application filed July 2, 1923. Serial No. 648,996.

*To all whom it may concern:*

Be it known that I, EDWARD E. JONES, a citizen of the United States, residing at Berkeley, in the county of Alameda and State of California, have invented certain new and useful Improvements in Automobile Bumpers, of which the following is a specification.

This invention relates to improvements in fenders, especially to a device of this character for use in connection with automobiles.

The principal object of my invention is to provide a fender for the front end of automobiles which will effectively prevent persons or animals from being injured by the machine. A further object of the invention is to so arrange the parts that they normally occupy a position wherein they are partially concealed and do not expose a large unsightly mechanism on the front of a machine. A still further object is to provide means whereby the fender may be thrown into an operative position either by the driver of the machine from his seat or automatically by coming in contact with the body of a person.

With these and other objects in view, the invention consists of certain novel features of construction, combinations and arrangements or parts hereinafter described and more specifically pointed out in the appended claims.

Referring to the annexed drawing in which my invention is illustrated:

Figure 1:
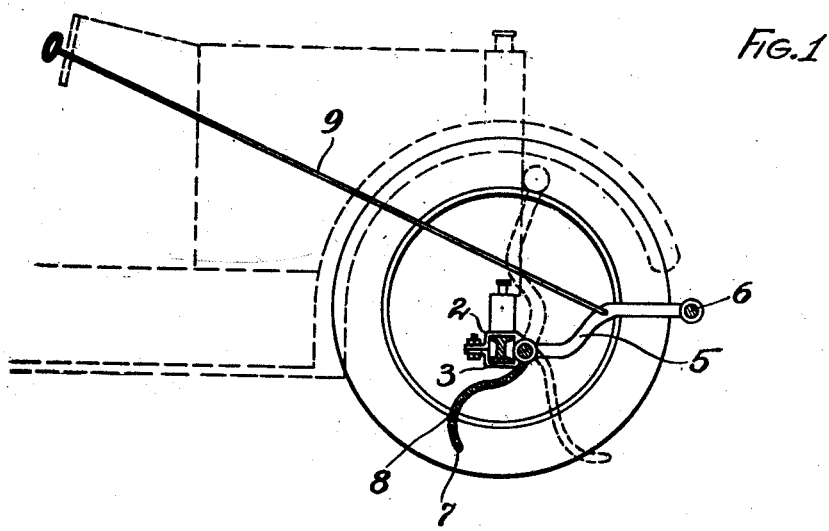
Figure 1 is a transverse sectional view of my fender in position on an automobile.
Figure 2:
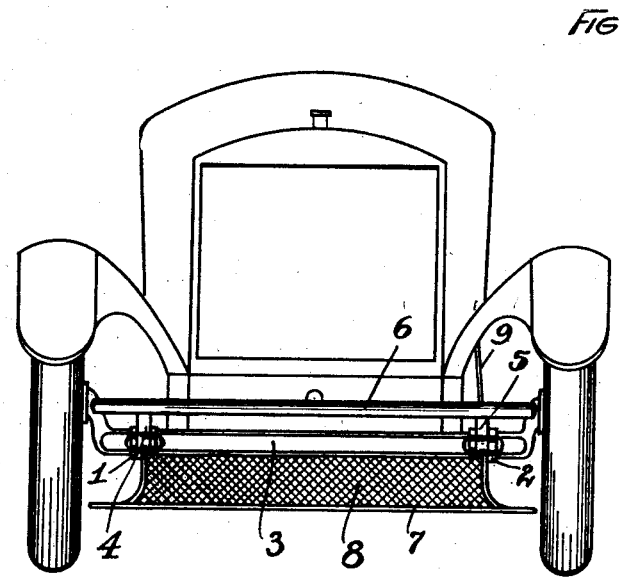
Figure 2 is a front elevation of the same.

Referring more particularly to the drawing: A pair of clamps 1 and 2 are secured to the front axle 3 adjacent the outer ends thereof. Arms 4 and 5 are pivoted approximately at their centers to the clamps 1 and 2 respectively. A horizontal bumper bar 6 is secured to the upper ends of the arms 4 and 5, and a rod 7 is secured to the lower ends thereof. A net 8 is secured to the arms 4 and 5 and to the rod 7, and extends from said rod to adjacent the pivot on said arms.

An operating rod 9 is secured to the arm 5 and extends rearwardly to the dash board, where it may be conveniently operated to control the fender.

Under normal conditions the bumper 6 is swung forwardly, and the net 8 is positioned under the axle and not in plain sight, as shown in Fig. 1. If a person is struck the bumper 6 will swing upwardly, which causes the net 8 to be swung outwardly, and the person is caught upon it (as shown in dotted lines Fig. 1). If the operator of the machine sees that a collision is inevitable he can swing the fender into operative position by pulling on the rod 9.

Having described my invention I claim:

1. A vehicle fender comprising a net pivoted to said vehicle and normally in an inoperative position, means to automatically swing said net into operative position if an object is struck and means adjacent the operator's position in said vehicle to manually swing said net into operative position.

2. An automobile fender comprising a pair of arms pivoted to said automobile, a net secured to said arms, means to automatically swing said arms forwardly into operative position, and means adjacent the operator's seat in said automobile to manually swing said arms forwardly into operative position.

3. An automobile fender comprising a pair of arms pivoted to said automobile, a bumper bar secured to the upper ends of said arms, a net secured to the lower part of said arms, and a rod secured to one of said arms, and extending to the dash board of the automobile.

4. An automobile fender comprising a pair of arms pivoted to said automobile, a bumper bar secured to the upper ends of said arms, said arms extending below the pivotal point and extending angularly to the upper portion of said arms, a net secured to the lower part of said arms and a rod secured to one of said arms and extending to the dash board of the automobile.

In testimony whereof I affix my signature.

EDWARD E. JONES.